UNITED STATES PATENT OFFICE 2,133,374

ORTHO-HYDROXYAZO DYES AND PROCESS FOR PRODUCING THE SAME

Walther Benade, Dessau in Anhalt, Germany, assignor to General Aniline Works, Inc., New York, N. Y., a corporation of Delaware No Drawing. Application December 23, 1937, Serial No. 181,381. In Germany January 13, 1937

11 Claims. (Cl. 260—202)

This invention relates to the manufacture of dyes which dye wool by the chroming process by coupling the diazo compounds of 2-aminobenzene-1-carboxylic acids which contain a sulfonic acid group with a propyl or butyl ester of 2-hydroxynaphthalene-6-carboxylic acid. The last-named compounds are obtainable by esterifying the 2-hydroxynaphthalene-6-carboxylic acid described in U. S. Patent No. 1,593,816 with a propyl or butyl alcohol. The dyes yield on wool dyed by the chroming process red dyeings which are characterized by their good properties of fastness.

As compared with the known dye 1-aminobenzene-2-carboxylic acid→2-hydroxynaphthalene-3-carboxylic acid isobutyl ester the dyes have the advantage of a better solubility in water. The first-named dye is not suitable for dyeing textiles on account of its extremely low solubility in water. As compared with the known dye 2-aminobenzene-1-carboxylic acid-4-sulfonic acid→2-hydroxynaphthalene the dyes of this invention have an improved fastness to fulling.

The following examples illustrate the invention, the parts being by weight:—

*Example 1.*—21.7 parts of 2-aminobenzene-1-carboxylic acid-5-sulfonic acid are stirred with 200 parts of water and after addition of 10 parts of hydrochloric acid of 12° Bé. are diazotized with 6.9 parts of sodium nitrite. The diazo compound is allowed to flow into a solution of 24 parts of 2-hydroxynaphthalene-6-carboxylic acid normal-propyl ester, 6 parts of sodium hydroxide and 15 parts of sodium carbonate in about 700 parts of water at 0° C. The formation of dye is complete in a short time. After it has been worked up and dried in the usual manner the dye is a red powder freely soluble in water and dyeing wool by the chroming process red tints of good properties of fastness.

*Example 2.*—To a solution of 25 parts of 2-hydroxynaphthalene-6-carboxylic acid isobutyl ester, 6 parts of sodium hydroxide and 15 parts of sodium carbonate in about 800 parts of water at 0° C. a diazo compound made from 21.7 parts of 2-aminobenzene-1-carboxylic acid-4-sulfonic acid, 6.9 parts of sodium nitrite and 10 parts of hydrochloric acid of 12° Bé. in about 300 parts of water. When coupling is complete, the dye formed is isolated and dried. It dyes wool by the chroming process red tints of good properties of fastness.

*Example 3.*—The diazo compound prepared as described in Example 1 from 21.7 parts of 2-aminobenzene-1-carboxylic acid-5-sulfonic acid is coupled at 0° C. with a solution of 25 parts of 2-hydroxynaphthalene-6-carboxylic acid normal-butyl ester, 6 parts of sodium hydroxide and 15 parts of sodium carbonate in about 800 parts of water. The dye worked up and dried in the usual manner is a red powder and dyes wool by the chroming process red tints of good fastness.

What I claim is:—

1. The dyes which correspond to the general formula

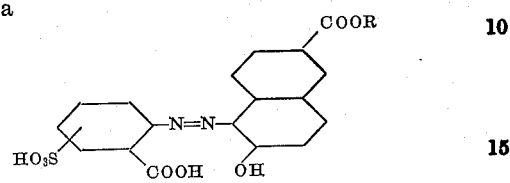

wherein R means an alkyl radicle of the group consisting of propyl and butyl, said dyes dyeing wool by the chroming process red dyeings of good fastness.

2. The dyes which correspond to the general formula

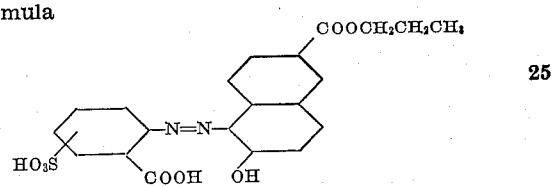

said dyes dyeing wool by the chroming process red dyeings of good fastness.

3. The dye which corresponds to the formula

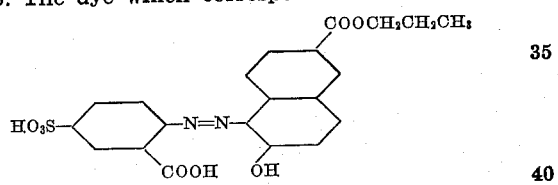

dyeing wool by the chroming process red dyeings of good fastness.

4. The process which comprises diazotizing a 2-aminobenzene-1-carboxylic acid-sulfonic acid and coupling the diazo compound with a member of the group consisting of 2-hydroxynaphthalene-6-carboxylic acid propyl ester and 2-hydroxynaphthalene-6-carboxylic acid butyl ester.

5. The process which comprises diazotizing a 2-aminobenzene-1-carboxylic acid-sulfonic acid and coupling the diazo compound with 2-hydroxynaphthalene-6-carboxylic acid normal-propyl ester.

6. The process which comprises diazotizing 2-aminobenzene-1-carboxylic acid-5-sulfonic acid and coupling the diazo compound with 2-hydroxy-naphthalene-6-carboxylic acid normal-propyl ester.

7. The dyes which correspond to the general formula

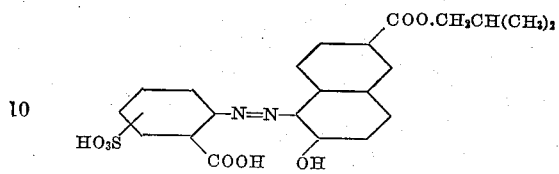

said dyes rendering red dyeings of good fastness on wool by the chroming process.

8. The dyes which correspond to the general formula

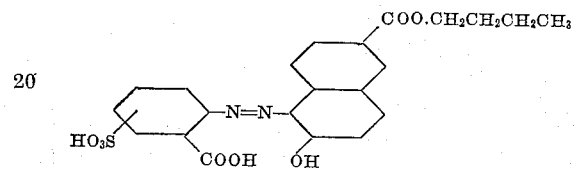

said dyes rendering red dyeings of good fastness on wool by the chroming process.

9. The dye which corresponds to the formula

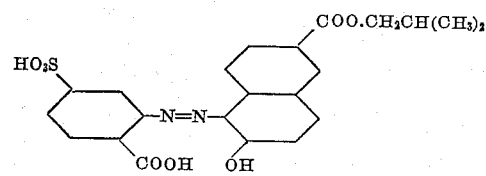

said dye rendering red dyeings of good fastness on wool by the chroming process.

10. The process which comprises diazotizing a 2-aminobenzene-1-carboxylic acid-sulfonic acid and coupling the diazo compound with 2-hydroxy-naphthalene-6-carboxylic acid iso-butyl ester.

11. The process which comprises diazotizing a 2-aminobenzene-1-carboxylic acid-sulfonic acid and coupling the diazo compound with 2-hydroxy-naphthalene-6-carboxylic acid normal-butyl ester.

WALTHER BENADE.